(12) United States Patent
Guo et al.

(10) Patent No.: US 8,149,279 B2
(45) Date of Patent: Apr. 3, 2012

(54) APPARATUS AND METHOD FOR COMPENSATING FOR VARIATIONS IN DIGITAL CAMERAS

(75) Inventors: Haitao Guo, San Jose, CA (US); Ting Chen, Sunnyvale, CA (US); David Kuo, San Jose, CA (US)

(73) Assignee: Apple Inc., Supertino, CA (US)

( * ) Notice: Subject to any disclaimer, the term of this patent is extended or adjusted under 35 U.S.C. 154(b) by 640 days.

(21) Appl. No.: 12/193,580

(22) Filed: Aug. 18, 2008

(65) Prior Publication Data

US 2010/0039530 A1 Feb. 18, 2010

(51) Int. Cl.
*H04N 17/02* (2006.01)

(52) U.S. Cl. ........................................ 348/187
(58) Field of Classification Search .................. 348/187, 348/188, 223.1, 224.1, 225.1
See application file for complete search history.

(56) References Cited

U.S. PATENT DOCUMENTS

| | | | |
|---|---|---|---|
| 6,016,161 A * | 1/2000 | Robinson ....................... | 348/187 |
| 6,285,344 B1 | 9/2001 | Everard et al. | |
| 6,542,198 B1 | 4/2003 | Hung et al. | |
| 6,618,508 B1 | 9/2003 | Webb et al. | |
| 6,687,295 B1 | 2/2004 | Webb et al. | |
| 6,714,720 B1 | 3/2004 | Lightstone et al. | |
| 7,554,575 B2 * | 6/2009 | Zandifar et al. ............... | 348/187 |
| 7,663,670 B1 * | 2/2010 | Orboubadian ............. | 348/231.2 |
| 2002/0113881 A1 * | 8/2002 | Funston et al. ............... | 348/223 |
| 2003/0007077 A1 * | 1/2003 | Maggi ........................ | 348/223.1 |
| 2005/0180631 A1 * | 8/2005 | Zhang et al. .................. | 382/173 |
| 2006/0098096 A1 * | 5/2006 | Gupta et al. .................. | 348/188 |
| 2008/0002037 A1 * | 1/2008 | Ueda .......................... | 348/223.1 |
| 2009/0213250 A1 * | 8/2009 | Alakarhu et al. ............. | 348/243 |

OTHER PUBLICATIONS

Rockwell, Ken. "How to Set White Balance," KenRockwell.com, 2006 (retrieved Apr. 26, 2011).*

* cited by examiner

*Primary Examiner* — Jason Whipkey
(74) *Attorney, Agent, or Firm* — Fletcher Yoder PC

(57) ABSTRACT

A method of manufacturing a digital video camera is provided. The method comprises acquiring video images of colored light, and measuring a light intensity response of the video camera to the colored light. The method further comprises comparing the intensity of the measured response to a desired colored light intensity for determining a color intensity bias and storing the intensity bias for the colored light in the camera so that the bias can be applied when the camera is operating at an arbitrary lighting condition.

8 Claims, 5 Drawing Sheets

APPARATUS AND METHOD FOR COMPENSATING FOR VARIATIONS IN DIGITAL CAMERAS

BACKGROUND OF THE INVENTION

1. Field of the Invention

The present invention relates generally to digital cameras and, more particularly, to calibrating digital camera components to minimize manufacturing variations in such components.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Digital cameras are becoming more accessible for users, especially as such cameras are being incorporated into a wide variety of prevalent digital devices extensively utilized in everyday life. Such devices may include digital phones, hand-held devices, digital notebooks, desktops and so forth. When incorporated into such devices, the digital cameras may form an independent distinct module operably coupled to additional subcomponents, such as processors, memory devices, video cards, and additional peripheral devices disposed within or coupled to the aforementioned digital devices.

Accordingly, such camera modules may be manufactured separately as independent units before being incorporated into a larger digital device, such as those mentioned above. During the manufacture of the digital camera modules, inherent variations in manufacturing processes of subcomponents of the camera module may result in variations in the physical and operational attributes of the subcomponents. Such attributes may correspond to, for example, lens thickness, color response, wavelength (e.g., infra-red (IR)) cut-off, variations in chief ray angle (CRA), and so forth. To the extent that variations in the above parameters exist, similar cameras manufactured on similar product lines may operate non-uniformly. For example manufacturing variations may result in variations in response to external stimuli, such as ambient light. Such variations in camera responses may produce a non-uniformity in images rendered by digital cameras of the same type, consequently, leading to an inconsistent product performance and to variations in product line(s).

SUMMARY

Certain aspects of embodiments disclosed herein by way of example are summarized below. It should be understood that these aspects are presented merely to provide the reader with a brief summary of certain forms an invention disclosed and/or claimed herein might take and that these aspects are not intended to limit the scope of any invention disclosed and/or claimed herein. Indeed, any invention disclosed and/or claimed herein may encompass a variety of aspects that may not be set forth below.

In one embodiment, there is provided a method of manufacturing a digital camera. The method includes acquiring video images of colored light, and measuring a light intensity response of the camera to the colored light. The method further includes comparing the measured response intensity to a desired colored light intensity for determining a color intensity bias, and storing the intensity bias for the colored light in the camera so that the bias can be applied when the camera is operating at an arbitrary lighting condition.

In another embodiment, there is provided a device including a digital camera adapted to acquire video or still images. The device further includes a memory device coupled to the digital camera, wherein the memory device is adapted to store data configured to calibrate intensities of red, green and/or blue (RGB) colored light rendered in the acquired video images. Further, the above digital camera can be incorporated within a media player having a signal processor coupled to the digital camera and to the memory device, such that the signal processor is adapted to further adjust the calibrated color intensities of the acquired video images.

BRIEF DESCRIPTION OF THE DRAWINGS

These and other features, aspects, and advantages of the present invention will become better understood when the following detailed description of certain exemplary embodiments is read with reference to the accompanying drawings in which like characters represent like parts throughout the drawings, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
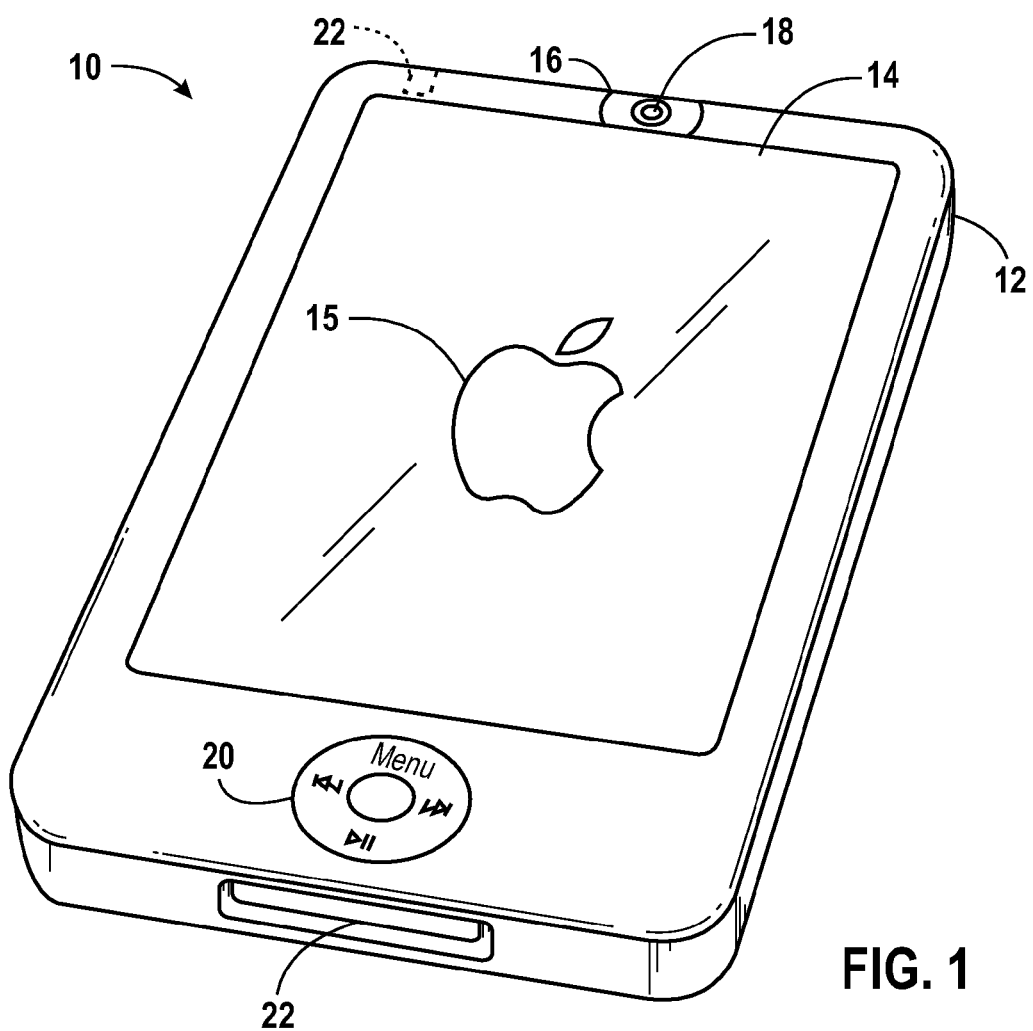
FIG. 1 is a perspective view illustrating a portable media player in accordance with one embodiment of the present invention.

An exemplary electronic device 10 is illustrated in FIG. 1, in accordance with one embodiment of the present invention. In some embodiments, including the presently illustrated embodiment, the device 10 may be a portable electronic device, such as a media player, a cellular phone, a personal data organizer, or the like. Indeed, in such embodiments, a portable electronic device may include a combination of the functionalities of such devices. In addition, the electronic device 10 may allow a user to connect to and communicate through the Internet or through other networks, such as local or wide area networks. For example, the portable electronic device 10 may allow a user to access the internet and to communicate using e-mail, text messaging, instant messaging, or using other forms of electronic communication. By way of example, the electronic device 10 may be a model of an ipod having a display screen or an iPhone available from Apple Inc.

In certain embodiments, the device 10 may be powered by one or more rechargeable and/or replaceable batteries. Such embodiments may be highly portable, allowing a user to carry the electronic device 10 while traveling, working, exercising, and so forth. In this manner, and depending on the functionalities provided by the electronic device 10, a user may listen to music, play games or video, record video or take pictures, place and receive telephone calls, communicate with others, control other devices (e.g., via remote control and/or Bluetooth functionality), and so forth while moving freely with the device 10. In addition, the device 10 may be sized such that it fits relatively easily into a pocket or a hand of the user. While certain embodiments of the present invention are described with respect to a portable electronic device, it should be noted that the presently disclosed techniques may be applicable to a wide array of other, less portable, electronic devices and systems that are configured to render graphical data, such as a desktop computer.

In the presently illustrated embodiment, the exemplary device 10 includes an enclosure or housing 12, a display 14 and a camera 16 having a lens 18. The exemplary device 10 further includes user input structures 20, and input/output connectors 22. The enclosure 12 may be formed from plastic, metal, composite materials, or other suitable materials, or any combination thereof. The enclosure 12 may protect the interior components of the electronic device 10 from physical damage, and may also shield the interior components from electromagnetic interference (EMI).

The display 14 may be a liquid crystal display (LCD), a light emitting diode (LED) based display, an organic light emitting diode (OLED) based display, or some other suitable display. In accordance with certain embodiments of the present invention, the display 14 may display a user interface and various other images, such as those captured by the camera 16 or logos, avatars, photos, album art, and the like. Additionally, in one embodiment, the display 14 may include a touch screen through which a user may interact with the user interface. The display may also include various function and/or system indicators to provide feedback to a user, such as power status, call status, memory status, or the like. These indicators may be incorporated into the user interface displayed on the display 14.

In one embodiment, the camera 16 allows a user to capture video images via the lens 18 adapted to collect and focus external light used for forming viewable video images on the display 14. While in the illustrated embodiment the camera 16 and the lens 18 are shown to be disposed on a top portion of the enclosure 12, it should be appreciated that in other embodiments such elements may be disposed on a bottom, side, or back portions of the device 10. In other embodiments, the camera 16 and the lens 18 may be located on a moveable or rotatable element which is coupled to the enclosure 12. Still further, the camera 16 may be detachable from the enclosure 12. Still further, multiple cameras may be included in the same enclosure 12.

As discussed in detail below, the device 10 may include image acquiring, processing and generating elements adapted to store and execute image calibration schemes used for adjusting various image parameters, such as color response, image white balance (WB), IR filtering (e.g., wavelength cut-off), and so forth. Accordingly, such calibration methods are directed for reducing camera-to-camera variations, such as those resulting from the manufacturing of the camera 16 and its components, as well as those resulting from the entire manufacturing process of the media player 10. Consequently, such calibration schemes are adapted to ensure that media players, such as the device 10, render images consistently and in a manner conforming to the user's liking and expectation. In this manner, media players incorporating digital camera modules, i.e., the camera 16, can operate uniformly with minimal variations, thus, preserving and enhancing product performance and product-line uniformity.

As further illustrated, in one embodiment, the device 10 includes one or more of the user input structures 20 configured to control the device 10, such as by controlling a mode of operation, an output level, an output type, etc. For instance, the user input structures 20 may include a button to turn the device 10 on or off. Further, the user input structures 20 may allow a user to interact with the user interface on the display 14. Embodiments of the portable electronic device 10 may include any number of user input structures 20, including buttons, switches, a control pad, a scroll wheel, or any other suitable input structures. The user input structures 20 may work with the user interface displayed on the device 10 to control functions of the device 10 and/or any interfaces or devices connected to or used by the device 10. For example, the user input structures 16 may allow a user to navigate a displayed user interface or to return such a displayed user interface to a default or home screen.

The exemplary device 10 may also include various input and output ports 22 to allow connection of additional devices. For example, a port 22 may be a headphone jack that provides for the connection of headphones. Additionally, a port 22 may have both input/output capabilities to provide for connection of a headset (e.g., a headphone and microphone combination). Embodiments of the present invention may include any number of input and/or output ports, such as headphone and headset jacks, universal serial bus (USB) ports, IEEE-1394 ports, and AC and/or DC power connectors. Further, the device 10 may use the input and output ports to connect to and send or receive data with any other device, such as other portable electronic devices, personal computers, printers, or the like. For example, in one embodiment, the device 10 may connect to a personal computer via an IEEE-1394 connection to send and receive data files, such as media files.

Figure 2:
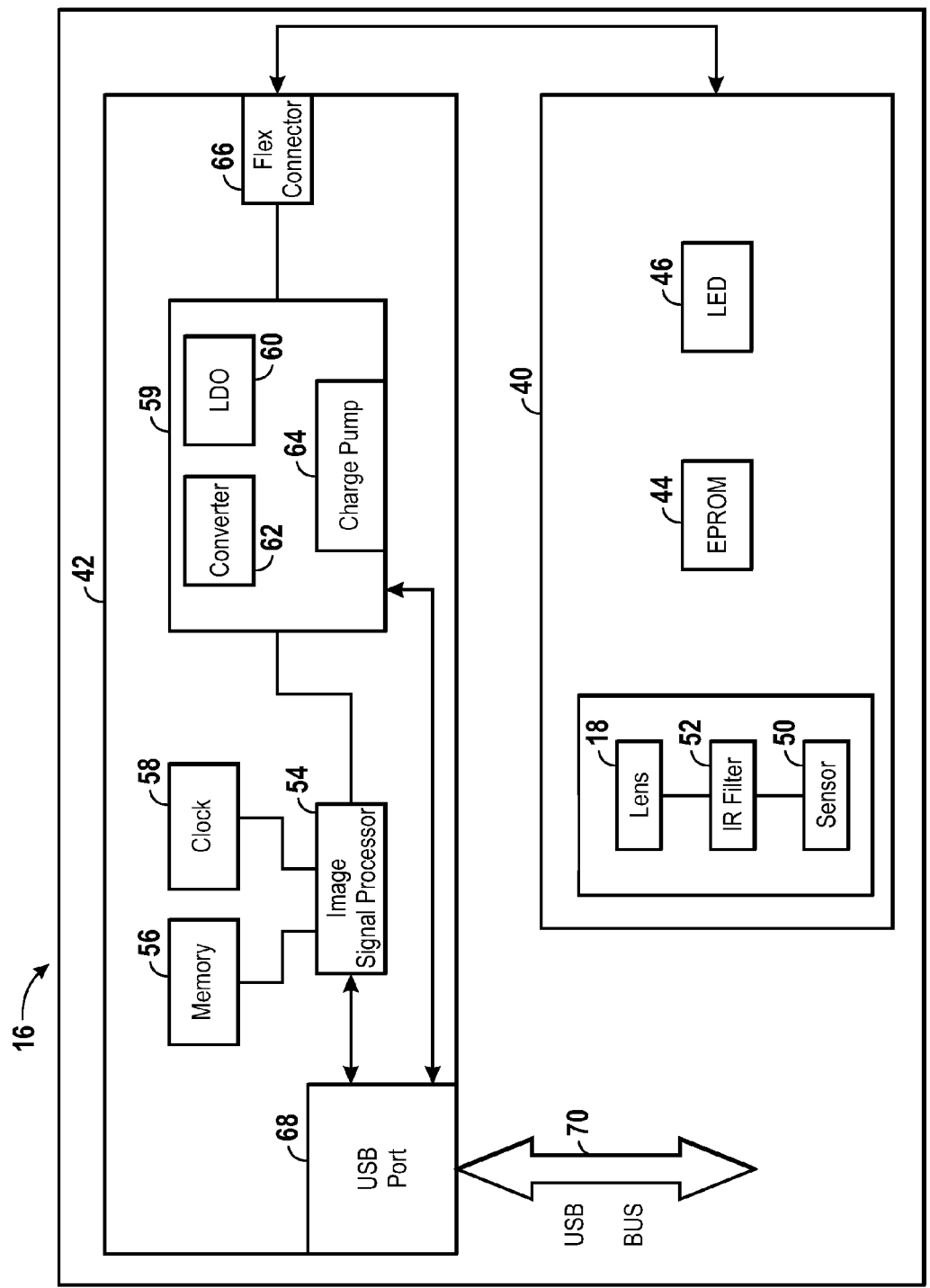
FIG. 2 is a simplified block diagram of a video digital camera in accordance with one embodiment of the present invention.

Additional details of the illustrative camera 16 which may be employed in the device 10 may be better understood through reference to FIG. 2. In the presently illustrated embodiment, the camera 16 is shown to include various elements associated with the camera 16 discussed above in FIG. 1. As illustrated, the camera 16 includes circuit boards 40 and 42, across which the various subcomponents of the camera 16 are disposed and/or are coupled thereto. In one embodiment, the circuit board 40 may be referred to as a flexible printed circuit board, while the circuit board 42 may be referred to as a forehead circuit board. Those skilled in the art will appreciate that other types of circuit boards may be used within the device 10 for incorporating the below described components.

The circuit board 40 includes an erasable programmable read only memory (EPROM) device 44 and a privacy control light emitting diode 46. As illustrated, circuit board 40 includes the camera lens 18, an image sensor 50, and an infrared (IR) filter 52. Those skilled in the art will appreciate that the various components of the camera 16 may be manufactured independently and, thereafter, integrated into the camera 16 via additional manufacturing processes and assembly steps.

The circuit board 42 includes an image signal processor 54, a memory device 56 and a clock 58. The memory device 56 may include flash, magnetic and/or optical memory devices or a combination thereof. The circuit board 42 further includes a power module 59 having a low drop-off (LDO) power regulator 60, a power converter 62 and a charge pump 64. As further illustrated, the circuit board 42 includes, a flex connector 66, a USB port 68 couplable to a USB bus 70.

In the presently illustrated embodiment, the flexible printed circuit board 40 is coupled via the flex connector 66 to the forehead board 42. In this manner, the EPROM 44 and the LED 46 disposed across the board 40 are operably coupled to the components of the board 42. The connection facilitated by the flex connector 66 enables data and power transfer between the boards 40 and 42, which in turn enables the devices disposed across the aforementioned boards to communicate, as well as receive and provide electrical power. For example, in this manner, components of the circuit board 42 may receive and process electrical signals provided by the components of the circuit board 40 for generating images, the EPROM 44 and the LED 46 may be powered by the power module 59 via the flex connector 66.

Further, the camera lens 18 may be a standard-type lens having a certain focal length. The lens 18 may be part of an aperture adapted to gather and focus the acquired light onto the image sensor 50. The image sensor 50, which may include a charge coupled device (CCD), a complementary metal oxide device (CMOS) and/or other silicon based electro-optical sensors, photonic and/or optical fiber based devices, and the like, are adapted to convert the focused light into electrical signals which can be digitally processed to form images. Further, the IR filter 52 may be made from an acrylic or Plexiglas-based material for providing wavelength cut-offs in desirable ranges, such as between 630-700 nm. The IR filter may also be made from Schott glass for providing high quality and long pass filtering. The camera module 16 may incorporate additional optical and electro-optical devices, such as lenses, polarizers, filters, and so forth, adapted to bolster the focusing of the light and enhance its conversion into reliable electrical signals.

Further, the EPROM 44 may include silicon-based devices, such as floating gate transistors, quartz-based devices and/or other programmable or erasable devices, adapted to be programmed and/or erased via electrical and/or optical signals, such as ultraviolet light. As will be discussed below, the EPROM 44 is adapted to store calibration data acquired during the manufacturing of the camera 16 for calibrating various parameter(s), i.e., color response, associated with the operational performance of components, such as the lens 18, image sensor 50, and so forth. The calibration data stored by the EPROM 44 may directly depend on the extent to which the above parameter(s) deviate from standard or otherwise acceptable industry or manufacturing specification ranges. Accordingly, when applied, the calibration data stored on the EPROM 44 reduces the above parameter deviations so that users may not differentiate between performances of different devices, e.g., the device 10, incorporating the camera 16.

While the circuit board 40 includes those devices adapted for acquiring and generating raw image data, the forehead board 42 includes components adapted for processing the raw image data used to generate viewable images configured to be displayed on the display 14 of the camera 16. The circuit board 42 further includes power managing and converting elements adapted for powering and allocating power among the components of the circuit boards 40 and 42. As further illustrated, the image signal processor(s) 54 is coupled to the memory 56, the clock 58, the power module 59 and to the USB port 68. The processor(s) 54 may include one or more microprocessors, such as one or more "general-purpose" microprocessors, one or more special-purpose microprocessors and/or ASICS, or some combination thereof. For example, the processor 54 may include one or more reduced instruction set (RISC) processors, such as a RISC processor manufactured by Samsung, as well as graphics processors, video processors, and/or related chip sets. The processor 54 may further include field programmable gate arrays (FPGAs) for executing simplified and/or custom-specified logic functions and the like. Those skilled in the art will appreciate that the illustrated clock 58 supports and facilitates synchronization of multiple logical operations and tasks executed by the processor 54. While the present embodiment illustrates the clock 58 as a separate component, other embodiments may include the clock 58 as an integral component of the processor 54.

Hence, the processor 54 is adapted to provide processing capabilities to execute and implement operating system platforms, programs, algorithms and any other functions. For example, the processor 54 may execute on-the-fly algorithms adapted for generating and processing images acquired via the camera 16. Specifically, as discussed below, the processor 54 is adapted to calibrate and adjust image parameters, such as color response, white balance (WB), etc., for implementing and augmenting the calibration data provided by the EPROM 44. In so doing, the processor 54 is adapted to further reduce module-to-module variations, such as those associated with the manufacturing of camera modules 16. Those skilled in the art will appreciate that the processor 54 is adapted to execute and support additional routines associated with standard on-the-fly functionalities, such as auto-focus, video play back, image filtering and other firmware related operations. Such functionalities may be invoked and called upon by the processor 54 using data files stored by the memory 56, having storage capacity for storing audio and/or video files, as well as the above mentioned firmware files. Further, the processor 54 may be coupled to external computing or communication devices couplable to Internet, intranet or other web-based networks for uploading and/or downloading files, such as video and image files, via the USB port 68.

Further, the power module 59 is adapted to manage the conversion, allocation and regulation of electrical power it receives from the USB port 68. In so doing, the module 59 powers the components of the circuit board 42, such as the processor 54, as well as the components of the circuit board 40 via the flex connector 66. Accordingly, the USB port 68 provides the power module 59 with an operating voltage, such as approximately 5.0 Volts (V), used by the LDO power regulator 60, the converter 62 and charge pump 64 for regulating, allocating and stabilizing voltages among the various components of the circuit 40 and 42. For example, the converter 62 may convert various input voltages for satisfying voltage requirements, such as those required for operating various analog and/or digital components of the circuit board 40 and/or 42. In one exemplary embodiment, digital components, such as the processor 54, the memory 56, the clock 58, etc., may require 3.3 V to operate, while analog components, such as the sensor 50, LED 46 and so forth, may require an operating voltage of approximately 1.8 V. As appreciated, other embodiments may require different operating voltages for the various components of the circuit 40 and 42. In addition, the charge pump 64 may be adapted to reduce perturbations in the above-provided voltages, thus, stabilizing the operation of those components powered by the module 59.

Further, during manufacturing of the camera module 16, its components, e.g., image sensor 50, can be electrically coupled to the board 40 and to other components of the camera 16. Thus, in one exemplary embodiment, during the manufacturing of the camera 16, the components may be placed on the circuit board 40 to form a single structure, while in other embodiments, the manufacturing of the camera 16 may entail separately placing of each of the components on the circuit board 40.

In addition, in accordance with embodiments of the present invention, the manufacturing process of the device 10 or the camera 16, also includes a calibration stage, which measures and stores key parameters that quantify the variation among camera modules 16.

Accordingly, as will be further described below with reference to FIGS. 3 and 4 in the calibration process, the EPROM 44 is uploaded with biases of colored (red, green, blue (RGB)) light intensities. Such intensity biases are used for individually adjusting and compensating each RGB colored light so that they are consistently rendered in images acquired by the device 10. For example, in one embodiment, the RGB bias, i.e., compensation data, is generated by using the media player 10 to acquire video images of R, G, or B light. Further, as such images are acquired, an exposure is performed at a specific ambient lighting condition, such as one produced by a lamp emitting white light having a certain intensity profile. The above video images are acquired for each R, G, and B colors separately so as to obtain a separate output image for each of the aforementioned colors. In so doing, color intensity outputs of video images may be measured and compared against desired intensities for the specific RGB color. This comparison is used for determining a bias between the actual and the desired response of the camera for each RGB color. Such a color bias can be stored on the EPROM 44 and later retrieved for adjusting the color response while the camera 16 is operating under arbitrary lighting conditions. For instance, on an 8-bit color scale where color intensity levels range from 0-255, the red color output response of the camera to the above exposure of light may be 175, while a desired output may be 150. Thus, a desired multiplication factor of $(150/175)=0.8571$ is stored on the EPROM 44, where it is utilized during the operation of the device 10 as the camera 16 acquires images at an arbitrary lighting condition. In other words, in this example, when the user operates the camera module 16 under general or otherwise arbitrary lighting conditions, the red color intensity bias is retrieved from EPROM 44 and applied to the intensity of the acquired red light video image through multiplication.

The manufacturing steps described above can be employed to obtain the compensation factor for the green light in a manner similar to that described above. That is, the camera 16 is placed at the above ambient lighting conditions while it acquires video images consisting mostly of green light having a particular intensity. In so doing, the green color response of the camera to the light may be measured and compared against a desirable response under the same light. For instance, the measured response of the camera 16 may yield a green color intensity of 145 while a desired level may by 180, thereby producing a multiplication factor of $(180/145)=1.2414$. Again, this value is stored on the EPROM 44 and applied to the green color through multiplication when the camera 16 operates under general or arbitrary lighting conditions.

The above steps are further applied to obtain a blue color intensity bias which is also stored on the EPROM 44 and applied for adjusting blue color intensities in images rendered by the device 10 under the arbitrary lighting conditions. It should be appreciated that the above numerical figures representing color intensity levels are exemplary and do not necessarily reflect the actual measured values or values storable on the EPROM 44.

While the exemplary embodiment discussed above obtains the light intensity biases using a specific lighting condition such as the one produced by the white light, other exemplary embodiments may obtain multiple or plurality of biases corresponding to a plurality of lighting conditions for each RGB light. For instance, during manufacturing of the device 10, the camera 16 may be exposed to multiple ambient lighting conditions while shined with colored light, i.e., R, G, or B, having specific color intensity. Accordingly, as the ambient lighting conditions vary, different responses and, hence, different biases, such as those discussed above, may be obtained for each RGB colored light. For instance, for one lighting condition, the factor to be applied to the green light may by 1.0, while for a second ambient lighting condition, the factor should be 1.1. Again, it should be noted that these specific bias values are provided for illustration purposes only. In a similar fashion, a plurality of biases is obtained for the R and B colored light intensities corresponding to the plurality of lighting conditions. Thus, in such an exemplary embodiment, the EPROM 44 is uploaded with the aforementioned light intensity biases for each RGB so that they may be retrieved and applied while the camera module 16 is operating at a lighting condition that corresponds to one of the plurality lighting conditions used for obtaining one of the corresponding biases. In other words, during operation, the device 10 retrieves from the EPROM 44 one bias among the plurality of biases for each RGB color best corresponding to the specific lighting condition under which the camera 16 and the device 10 are operating.

As further discussed below with regard to FIG. 5, the second correction block is adapted to reduce variations in the color response of the camera module 16 is provided by the processor 54. The processor 54 is configured to execute a white balance (WB) correction algorithm corresponding to further intensity adjustments of the RGB light rendered in images acquired by the device 10. The processor 54 executes such an algorithm after the light intensity biases stored on the EPROM 44 are applied to images for initially adjusting the color response of the camera module 16, as discussed above with regard to the first correction block. In so doing, the second correction block is adapted to refine the adjustments provided by the first correction block for further enhancing the images rendered by the device 10 at arbitrary lighting conditions.

Accordingly, in the second correction block, the processor 54 analyzes images acquired by the device 10 for comparing between intensities of RGB colored light contained within the acquired images. Hence, such a comparison is adapted to point out whether certain or some color intensities included within the image are relatively too high or low, thereby skewing those colors to be overly dominant or not noticeable, respectively, in the acquired image. Thus, to correct for such color deviations, the processor 54 may shift the color intensities of the color(s) of the image so as to approximately equate the RGB color intensities in the image, thereby lowering or otherwise removing the dominance of certain color(s) in the image while increasing the dominance of other colors in the image. In so doing, the algorithm implemented by the processor 54 operates under a gray world assumption in which the relative intensities of an image averaged globally may approach an equal magnitude, i.e., sum(R)= sum(G)=sum(B). However, it should be appreciated that in actuality the aforementioned assumption serves as a general guide and is approximately realized when adjusting the WB of the images rendered by the device 10.

The second correction block executed by the processor 54 may be illustrated by a numerical example using the 8-bit color scale. For example, an image acquired by the camera module 16 may be rendered by the device 10 such that the color intensities of the image, averaged over the whole image, are given by average(R)=135, average(G)=185 and average (B)=150. It should be noted that the device 10 may yield such color intensities after it implements the first correction block, after the device 10 retrieves the calibration data from the EPROM 44 and applies it to the image. In one example, upon comparison of the relative color intensities of the image it may appear that the green intensity is overly elevated while the red and/or blue color intensities are overly lowered. This may constitute a shift in the WB of the image, thereby rendering the image overly green to a viewer.

To correct for this, the processor 54 may lower the green light intensity and/or raise the red light intensities of the image so as to approximately equate the RGB intensities of the image. This will reduce the amount of green color, as well as enhance the red and/or blue colors contained in the image. Thus, in the above example in which R=135, G=185 and B=150, the processor 54 acts to reduce the green intensity, for instance, by 20 and elevate the red and blue intensities by 15 and 5, respectively, thereby achieving an image having R=150, G165 and B=155. In one embodiment, such color intensity shifts are implemented by the processor 54 so that they do not exceed 10-15 percent of the initial intensity color values obtained after the implementation of the first correction block. In other embodiments, different percentages may be applied for shifting the relative color intensities, as may be dictated by system and/or operational criteria. Such percentages of the intensity values provide limits on the amount of color shifting applied by the processor 54 so as to avoid over-shifting and/or distorting the color content of mages rendered by the device 10. Again, it should be appreciated that the color intensity values used above are only for illustrating the present technique and that other values may be used.

Figure 3:
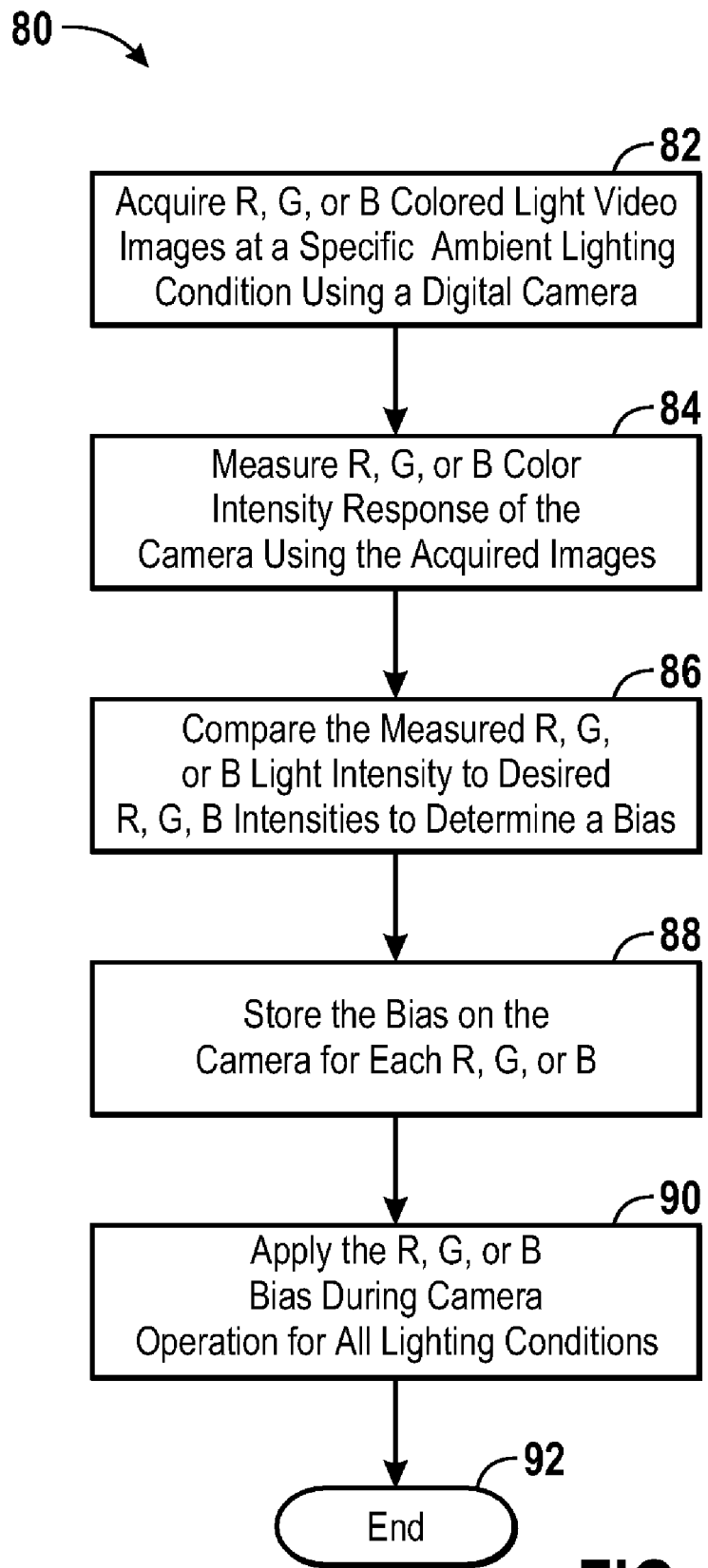
FIG. 3 is a flowchart depicting a process for calibrating a video digital camera in accordance with one embodiment of the present invention.

FIG. 3 is a flowchart depicting a process for calibrating a camera in accordance with one embodiment of the present invention. Accordingly, the figure illustrates a method 80 implemented as a first correction block for calibrating a color response of a digital camera, i.e., the camera 16, at a specific ambient lighting condition. The method 80 generates calibration data which can be applied to images acquired at arbitrary ambient lighting conditions, such as those existing while the media player 10 is in use. As mentioned above, the method 80 may be executed during the manufacturing process of the device 10, as the EPROM 44 is uploaded with the above desired calibration data.

Accordingly, the method 80 begins at block 82 in which a camera module of a media player (e.g., camera module 16 and media player 10) captures images under a specific light source. This step may be performed by capturing images of an object placed in the vicinity of the camera. In one exemplary embodiment, a surface having black and white patterns may be used as the object while other embodiments may include different kinds of surfaces with varying patterns for providing images used for measuring the color response of the camera. In addition, it should be noted that the step indicated by the block 82 is carried out while the camera is exposed to specific preselected ambient lighting conditions, such as those provided by a while light source, i.e., a lamp disposed in the vicinity of the camera.

Next, the method 80 proceeds to block 84 where the R, G or B video response of the camera 16 is measured in response to the R, G or B video image acquired at the block 82. The camera's response may be measured, for example, on an 8-bit, 9-bit, 10-bit, or n-bit, etc., color scale for providing color light intensity magnitudes representative of the exposures performed at the block 82. As mentioned above, the response of the camera obtained at the block 84 is specific to the ambient lighting condition applied at the block 82. Thereafter, the method 80 proceeds to block 86 where the color intensity responses obtained at the block 84 are compared to desired color responses, such as those adapted for optimally rendering RGB colored light in images acquired by the media player. Thus, at the block 86, the color intensity measured at the block 84 for each R, G or B is compared to a desired R, G or, B color intensity, respectively. In so doing, the method 80 obtains an amplification factor between the desired colored light intensities and those measured at step 84. This difference determines a bias for each R, G or B intensity which can be further used to calibrate the color response of the camera when it is operated during regular or otherwise arbitrary lighting conditions.

Accordingly, the method 80 proceeds to step 88 where the bias of each R, G or B obtained at step 86 is stored on the media player, such as on the EPROM 44 of the device 10, where it can be retrieved while the camera is operating and acquiring images. Hence, at step 90, the R, G, or B bias is retrieved from the EPROM 44 of the device 10 and applied to the acquired colored images during usage of the camera 16. Finally, the method 80 terminates at block 92. It should be noted that the method 80 is performed for each R, G or B color so as to obtain a bias for each of those colored signals, retrievable and applicable whenever images are acquired by the device 10 at arbitrary lighting conditions. It should also be noted that steps 82-88 are executed during manufacturing, while step 90 is subsequently executed by a user during operation.

Figure 4:
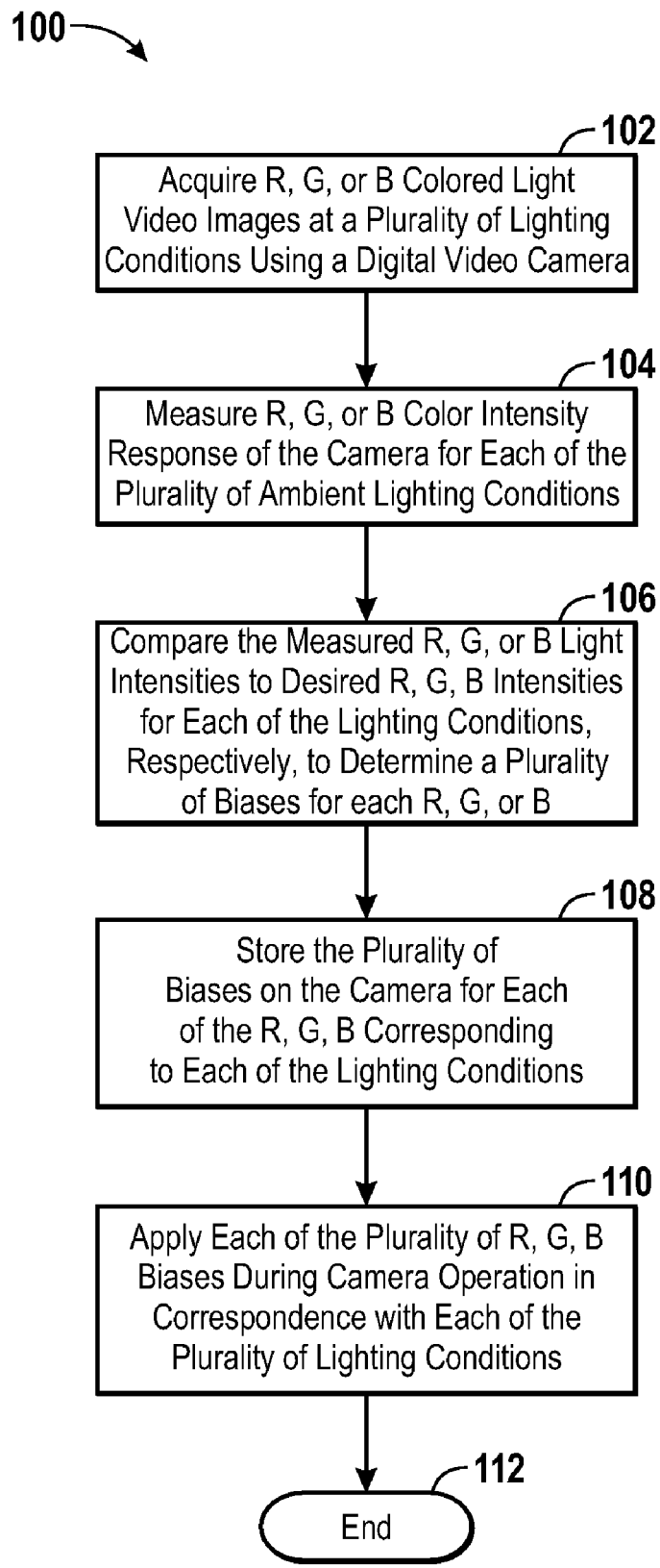
FIG. 4 is a flowchart depicting a process for calibrating a video digital camera in accordance with another embodiment of the present invention.

FIG. 4 is a flowchart depicting another process for calibrating a camera of a media player in accordance with another embodiment of the present invention. Accordingly, FIG. 4 depicts an alternate method 100 applied as the first correction block for calibrating a color response of a digital video camera (e.g., the camera 16) for each RGB at a plurality of ambient lighting conditions. Thus, the method 100 begins at block 102 where the camera acquires images having R, G or B colors at a plurality of ambient lighting conditions. Such a step includes using multiple ambient lighting conditions when capturing the R, G, B images to produce different color responses corresponding to each one of the plurality of lighting conditions. Accordingly, from step 102 the method 100 proceeds to step 104 whereby the RGB color response of the camera is measured for each one of the plurality of ambient lighting conditions. Hence, the block 104 generates a plurality of measurements quantified, for example, by 8, 9, 10, etc.,-bit color scales in a manner similar to that discussed above with respect to the method 80 of FIG. 3, the contents of which is incorporated herein by reference.

At the block 106 the method 100 compares each one of the plurality of measured color responses of the R, G or B images obtained at each one of the plurality of lighting conditions to desired colored responses for each one of the plurality of lighting conditions, respectively, utilized in the block 102. These comparisons then yield a plurality of intensity biases for each R, G, or B corresponding to each one of the plurality of lighting conditions used at the block 102. Hence, the biases obtained at the block 106 make up the calibration data adapted for reducing variations in color responses, such as those associated with the manufacturing of individual cameras 16 (FIGS. 1 and 2).

Thereafter, at step 108, the plurality of biases for each R, G or B is stored on the EPROM 44, where they can be retrieved while the camera 16 is operating to acquire images. Accordingly, at step 110, one or more of the plurality of biases corresponding to one or more of a plurality lighting conditions most matching a lighting condition present while the user acquires video images is retrieved from the EPROM 44 and applied to the acquired video images. In other words, the block 110 of the method 100 ensures that when the user acquires video images during operation of the device 10, the biases stored on the EPROM 44 of the device 10 are applied to the images so that those are rendered consistently with the lighting under which the video images were acquired. Finally, the method 100 terminates at block 112. It should be appreciated that the method 100 may be repeated in a manner described above so that the EPROM 44 stores calibration, i.e., bias, data for each color RGB color, corresponding to each one of the plurality of ambient lighting conditions discussed above with reference to the block 102. It should also be noted that steps 102-108 are executed during manufacturing, while step 110 is subsequently executed by a user during operation.

Figure 5:
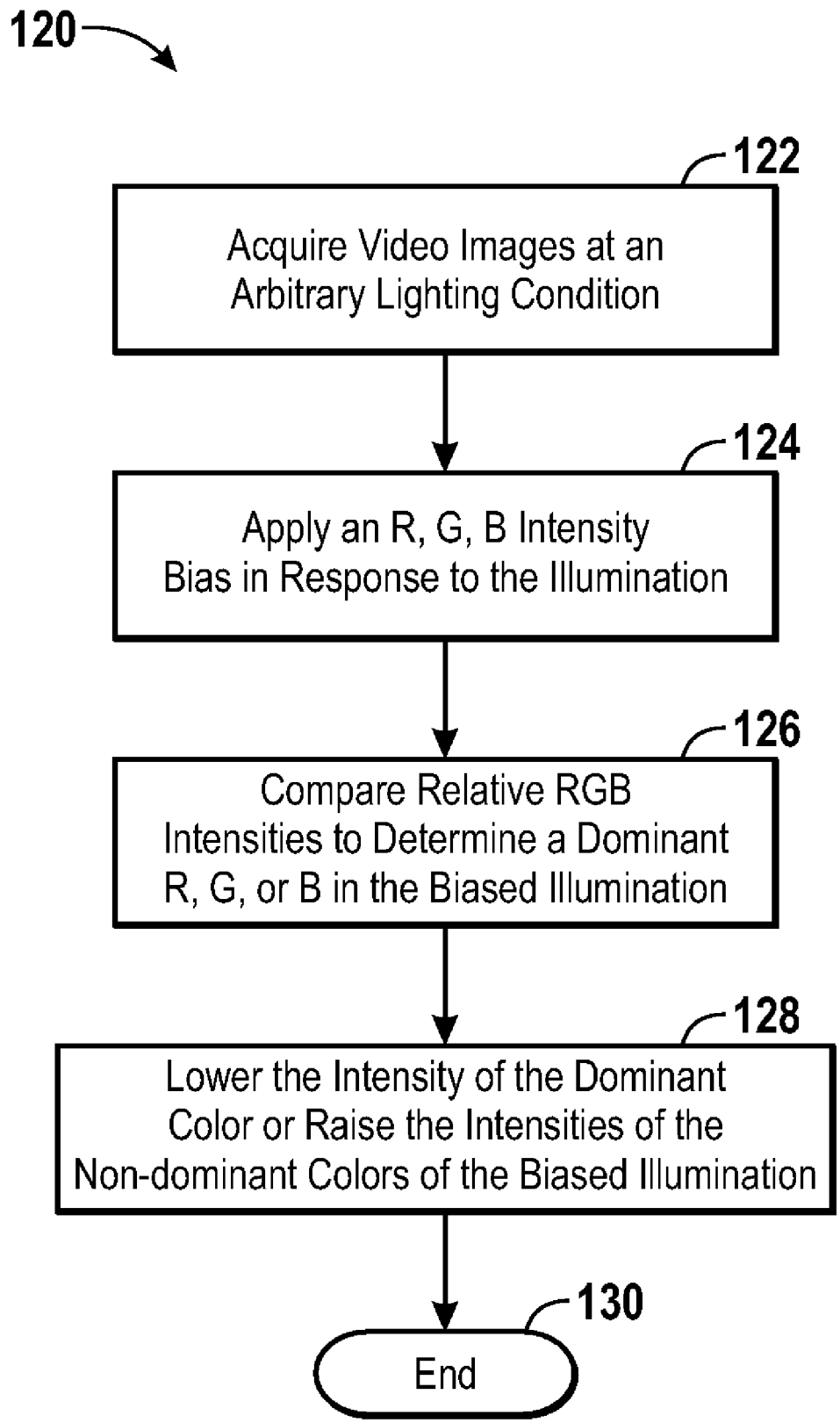
FIG. 5 is a flow chart depicting a process for adjusting video image color based on the calibrations shown in FIGS. 3 and/or 4, in accordance with one embodiment of the present invention.

FIG. 5 is a flow chart depicting a process for adjusting image color(s) based on the calibrations discussed in relation to the methods 80 and/or 100 as illustrated FIGS. 3 and/or 4, respectively, in accordance with one embodiment of the present invention. Hence, FIG. 5 illustrates a method 120 constituting a second correction block technique configured to refine and/or augment the above discussed RGB color intensity calibration, performed by the first correction block discussed above with reference to FIGS. 3 and 4. Accordingly, the method 120 is executed after the above calibrating biases (methods 80 and/or 100) are retrieved from the EPROM 44 and are applied for each of the RGB light intensities rendered in images acquired by the device 10. The refinements provided by the method 120 are adapted to further reduce deviations in image parameters, such as those associated with variations in video cameras (e.g., the camera 16 of the device 10 of FIGS. 1 and 2).

With the foregoing in mind, the method 120 begins at block 122 where a user acquires video images at arbitrary lighting conditions using the camera 16 of the device 10. That is, the block 122 exemplifies the acquisition of images as generally would be carried out during normal operation of the media player by a user. Thereafter, the method 120 proceeds to block 124 which includes applying the first block correction scheme of RGB intensity biases (methods 80 or 100) to the video images acquired at step 122. Thus, the block 124 alters the originally obtained R, G or B color light intensities so as to match those to more desirable light intensities, thereby reducing any video image artifacts such as those associated with variations in digital video cameras mentioned above (e.g., the camera 16 of FIGS. 1 and 2).

Thereafter, at block 126, the method 120 compares the relative intensities of the biased R, G, or B colored light appearing in the images acquired at the block 124 for determining which of the R, G, or B color(s) is dominant and/or which is non-dominant or otherwise absent from the acquired images. As mentioned above with respect to FIG. 3, this may be carried out, for example, by comparing between intensity magnitudes, such as those measured on an 8-bit scale (e.g., range of 0-255), of the RGB biased intensities rendered in acquired images. Thereafter, the method 120 proceeds to block 128 where intensities of those RGB color(s) which are overly present, under-represented or are otherwise absent, are lowered and/or increased, respectively, in the image. In so doing, the method 120 adjusts the RGB color intensities so as to approximately equate the R, G and B intensities in the image. That is to say that the RGB color intensities are adjusted such that they are approximately equal with respect to one another. It should be understood that such adjustments are applied to the extent the above lowering or increasing of each of the RGB color intensities does not exceed certain thresholds so as not to distort the color content of the acquired images. Finally, the method terminates at block 130.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of manufacturing a digital video camera, comprising:
    acquiring video images at a plurality of ambient lighting conditions to obtain a plurality of red, green, and blue colored light biases storable in the camera;
    measuring a light intensity response of the video camera to one of red, green, or blue colored light acquired from the video image;
    comparing the intensity of the measured response to a desired red, green, or blue colored light intensity for determining a red, green, or blue color intensity bias; and
    storing the red, green, or blue intensity bias so that the bias can be applied to images captured when the camera is operating at an arbitrary lighting condition.

2. The method of claim 1, wherein the video images are acquired at a specific ambient lighting condition.

3. The method of claim 2, wherein the specific ambient lighting condition is generated by a lamp adapted to emit generally white light.

4. The method of claim 1, wherein at least one of the plurality of red, green, and blue colored light biases is applied whenever the camera is operating at an ambient lighting condition that corresponds to at least one of the plurality of ambient lighting conditions.

5. The method of claim 1, wherein comparing comprises using an 8-bit color scale, a 9-bit color scale, a 10-bit color scale, or an n-bit color scale to compare the measured response to the desired colored light intensity.

6. A method of manufacturing a digital camera, comprising:
    acquiring video images at a plurality of ambient lighting conditions;
    measuring a light intensity response of the camera to one of red, green, or blue colored light for each of the plurality of ambient lighting conditions;
    comparing the measured response intensity to a desired red, green, or blue colored light intensity for each of the plurality of ambient lighting conditions, to determine a plurality of red, green, or blue color intensity biases; and
    storing the plurality of red, green, or blue color intensity biases so that the plurality of biases can be applied when the camera is acquiring images in at least one of the plurality of ambient lighting conditions.

7. The method of claim 6, wherein the plurality of red, green, or blue intensity biases are stored is an erasable programmable read only memory (EPROM) device.

8. The method of claim 6, wherein the plurality of red, green, or blue biases is predetermined during manufacturing of a media player.

* * * * *